(12) United States Patent
Dicintio et al.

(10) Patent No.: US 10,066,837 B2
(45) Date of Patent: Sep. 4, 2018

(54) COMBUSTOR AFT MOUNT ASSEMBLY

(71) Applicant: GENERAL ELECTRIC COMPANY, Schenectady, NY (US)

(72) Inventors: Richard Martin Dicintio, Simpsonville, SC (US); Elizabeth Angelyn Monaghan, Greenville, SC (US)

(73) Assignee: General Electric Company, Schenectady, NY (US)

( * ) Notice: Subject to any disclaimer, the term of this patent is extended or adjusted under 35 U.S.C. 154(b) by 436 days.

(21) Appl. No.: 14/627,029

(22) Filed: Feb. 20, 2015

(65) Prior Publication Data
US 2016/0245527 A1    Aug. 25, 2016

(51) Int. Cl.
| | |
|---|---|
| *F23R 3/60* | (2006.01) |
| *F01D 9/02* | (2006.01) |
| *F01D 25/28* | (2006.01) |
| *F02C 3/14* | (2006.01) |
| *F23R 3/00* | (2006.01) |
| *F23R 3/46* | (2006.01) |

(52) U.S. Cl.
CPC ............... *F23R 3/60* (2013.01); *F01D 9/023* (2013.01); *F01D 25/28* (2013.01); *F02C 3/14* (2013.01); *F23R 3/002* (2013.01); *F23R 3/46* (2013.01); *F05D 2230/53* (2013.01); *F05D 2230/60* (2013.01); *F05D 2230/64* (2013.01); *F05D 2240/40* (2013.01); *F05D 2250/37* (2013.01); *F05D 2260/31* (2013.01)

(58) Field of Classification Search
CPC . F01D 9/023; F01D 25/28; F02C 3/14; F05D 2230/53; F05D 2230/60; F05D 2230/64; F05D 2240/40; F05D 2240/90; F05D 2250/37; F05D 2260/31; F23R 3/46; F23R 3/60; F23R 3/002; F23R 2900/00017
USPC .......................................................... 60/752
See application file for complete search history.

(56) References Cited

U.S. PATENT DOCUMENTS

| | | | | |
|---|---|---|---|---|
| 2,625,013 | A | * | 1/1953 | Howard ............ F01D 9/041 415/138 |
| 3,481,146 | A | * | 12/1969 | Jackson ............ F23R 3/60 60/800 |
| 3,759,038 | A | | 9/1973 | Scalzo et al. |
| 5,414,999 | A | | 5/1995 | Barnes |
| 2012/0186260 | A1 | | 7/2012 | DiCintio et al. |
| 2013/0031908 | A1 | | 2/2013 | DiCintio et al. |

(Continued)

FOREIGN PATENT DOCUMENTS

| | | |
|---|---|---|
| GB | 610021 A | 10/1948 |
| GB | 686382 A | 1/1953 |

OTHER PUBLICATIONS

European Search Report issued in connection with corresponding EP Application No. 16155183.3 dated Jul. 14, 2016.

*Primary Examiner* — Phutthiwat Wongwian
*Assistant Examiner* — Loren Edwards
(74) *Attorney, Agent, or Firm* — Eversheds Sutherland (US) LLP

(57) ABSTRACT

The present application provides a gas turbine engine. The gas turbine engine may include a compressor discharge casing, a number of combustors configured in an annular array, and a number of aft mounting assemblies. An aft mounting assembly mounts a combustor to an inner diameter of the compressor discharge casing.

13 Claims, 5 Drawing Sheets

(56) References Cited

U.S. PATENT DOCUMENTS

| | | |
|---|---|---|
| 2013/0111910 A1 | 5/2013 | DiCintio et al. |
| 2013/0269820 A1 | 10/2013 | DiCintio et al. |
| 2013/0269821 A1 | 10/2013 | DiCintio et al. |
| 2013/0272863 A1 | 10/2013 | DiCintio et al. |
| 2014/0000265 A1 | 1/2014 | Simo et al. |
| 2014/0014792 A1 | 1/2014 | Wilis et al. |
| 2014/0069103 A1 | 3/2014 | Willis et al. |
| 2014/0182305 A1 | 7/2014 | Antoniono et al. |
| 2014/0260272 A1 | 9/2014 | DiCintio et al. |
| 2014/0260273 A1 | 9/2014 | Melton et al. |
| 2014/0260275 A1 | 9/2014 | Melton et al. |
| 2014/0260277 A1 | 9/2014 | DiCintio et al. |
| 2014/0260279 A1 | 9/2014 | DiCintio et al. |
| 2014/0260280 A1 | 9/2014 | Willis et al. |
| 2014/0260318 A1 | 9/2014 | Willis et al. |
| 2014/0260319 A1 | 9/2014 | Melton et al. |
| 2014/0352316 A1 | 12/2014 | Fadde et al. |
| 2014/0360193 A1 | 12/2014 | Stoia et al. |

\* cited by examiner

COMBUSTOR AFT MOUNT ASSEMBLY

TECHNICAL FIELD

The present application and the resultant patent relate generally to gas turbine engines and more particularly relate to a combustor aft mount assembly that provides for inner diameter mounting so as to accommodate higher combustion temperatures while providing ease of access.

BACKGROUND OF THE INVENTION

A combustion section of a gas turbine generally includes a number of combustors arranged in an annular array about a compressor discharge casing. A typical combustor may include an end cover coupled to the compressor discharge casing, an annular cap assembly that extends radially and axially within the compressor discharge casing, an annular liner that extends downstream from the cap assembly, and a transition piece that extends between the liner and a first stage of a turbine section. An aft frame portion of the transition piece may be coupled to the turbine casing for positioning and support.

In an effort to decrease the number of individual components within the combustor of the gas turbine, the transition piece and the combustion liner may be combined into a unibody component. Because such a unibody component may restrict access to the underside of the combustor, traditional inner diameter mounts may be difficult to use. Outer diameter mounts also may be used but such positioning may cause additional risk to the transition piece and the stage one nozzle seal due to the thermal transient response of the components.

There is thus a desire for an improved combustor aft mount assembly. Such an improved aft mount assembly may provide ease of access and ease of assembly with an inner diameter mount while avoiding the thermal issues common with an outer diameter mount.

SUMMARY OF THE INVENTION

The present application and the resultant patent thus provide a gas turbine engine. The gas turbine engine may include a compressor discharge casing, a number of combustors configured in an annular array, and a number of aft mounting assemblies. An aft mounting assembly mounts a combustor to an inner diameter of the compressor discharge casing.

The present application and the resultant patent further provide a method of securing a mounting assembly of a combustor to a compressor discharge casing or other location. The method may include the steps of positioning a mounting bracket on an inner diameter of the compressor discharge casing, the mounting bracket including a bolting wing extending circumferentially therefrom, accessing the bolting wing positioned circumferentially adjacent to the combustor, and securing a bolt through the bolting wing.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
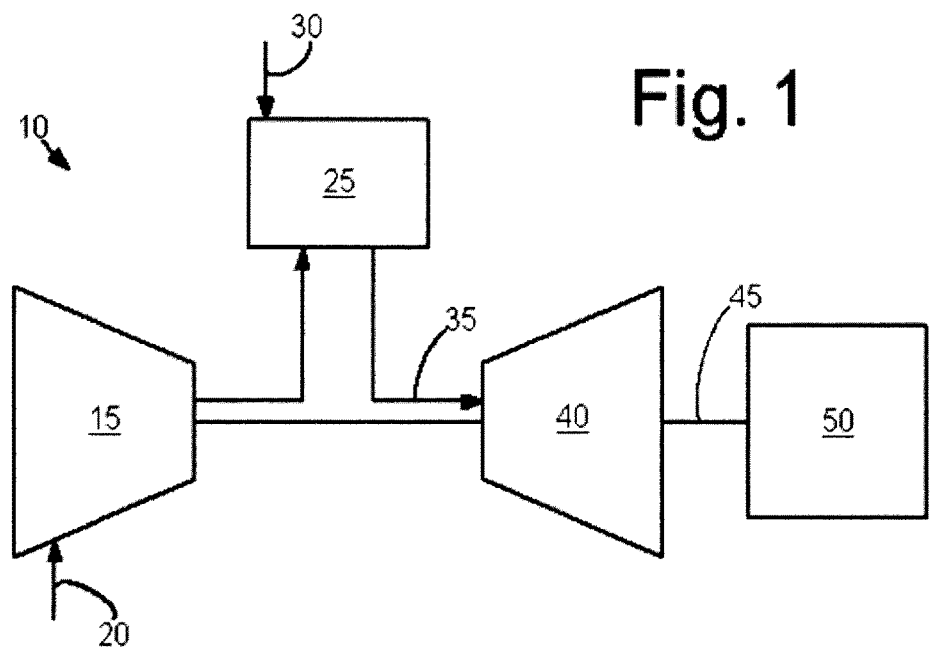
FIG. 1 is a schematic diagram of a gas turbine engine showing a compressor, a combustor, a turbine, and a load.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of the combustors 25 arranged in a circumferential array or otherwise. The flow of combustion gases 35 is delivered in turn to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
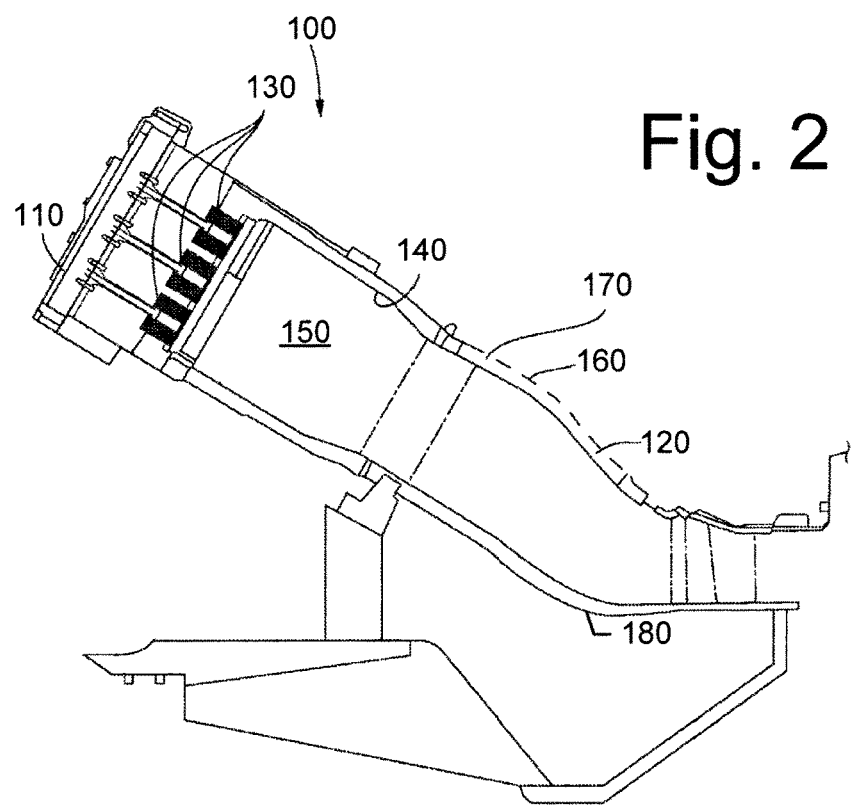
FIG. 2 is a perspective view of a combustor that may be used with the gas turbine engine of FIG. 1.

FIG. 2 shows an example of a combustor 100 as may be described herein. Generally described, the combustor 100 may extend from an end cover 110 at a head end to a transition piece 120 at an aft end about the turbine 40. A number of fuel nozzles 130 may be positioned about the end cover 110. A liner 140 may extend from the fuel nozzles 130 towards the transition piece 120 and may define a pressurized combustion zone 150 therein. The liner 140 may be surrounded by a flow sleeve 160. The liner 140 and the flow sleeve 160 may define a flow path 170 therebetween for the flow of air 20 from the compressor 15 or from other sources. Any number of the combustors 100 may be used herein in a can annular array and the like. In this example, the liner 140 and the transition piece 120 may be a unibody component 180. Other components and other configurations may be used herein.

Figure 3:
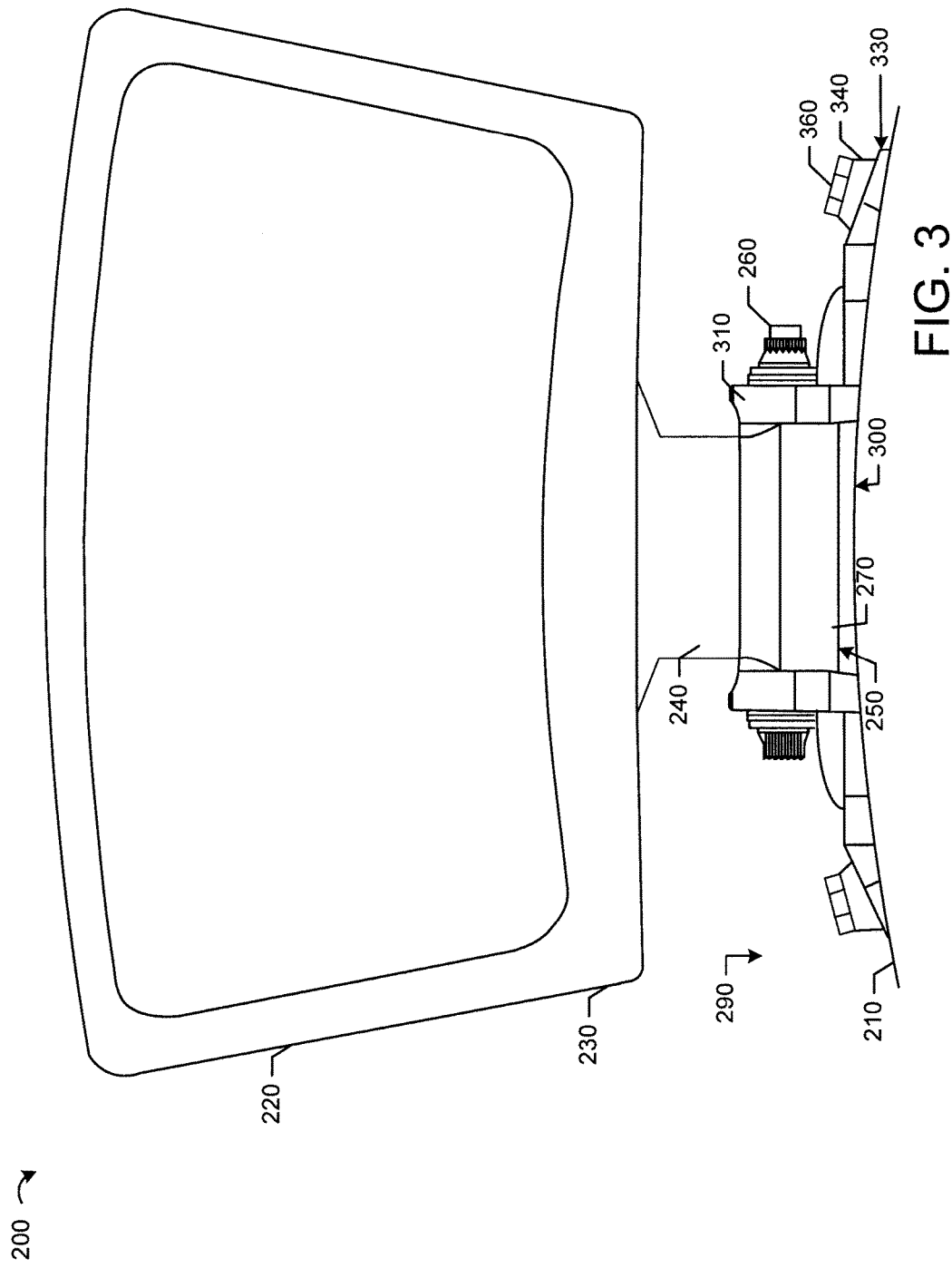
FIG. 3 is a front plan view of a combustor aft mount assembly as may be described herein.
Figure 4:
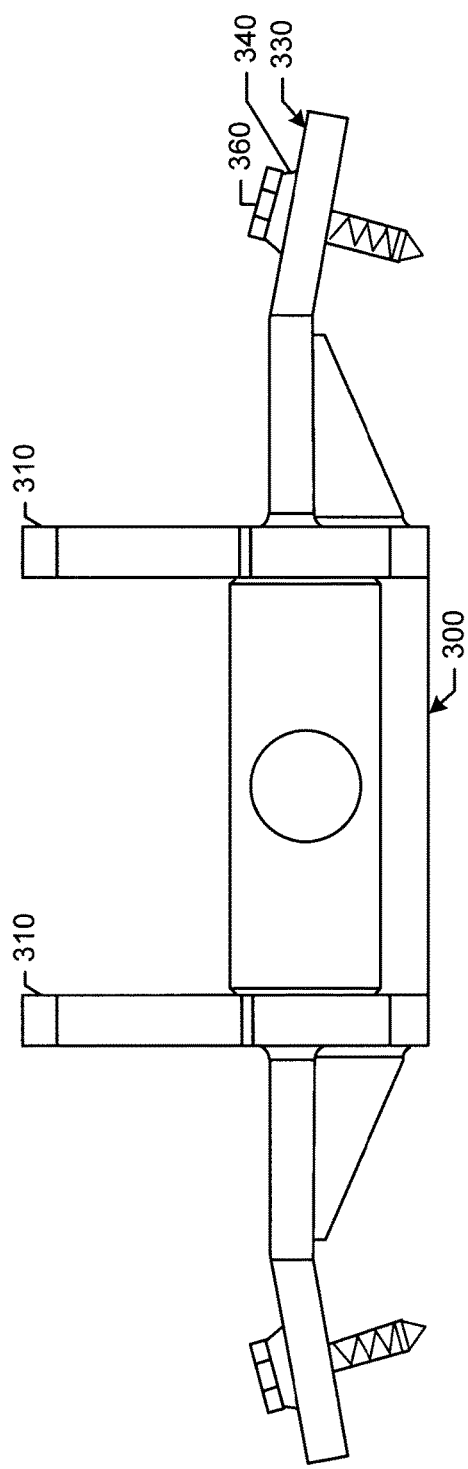
FIG. 4 is a perspective view of an inner diameter mounting bracket of the combustor aft mount assembly of FIG. 3.
Figure 5:
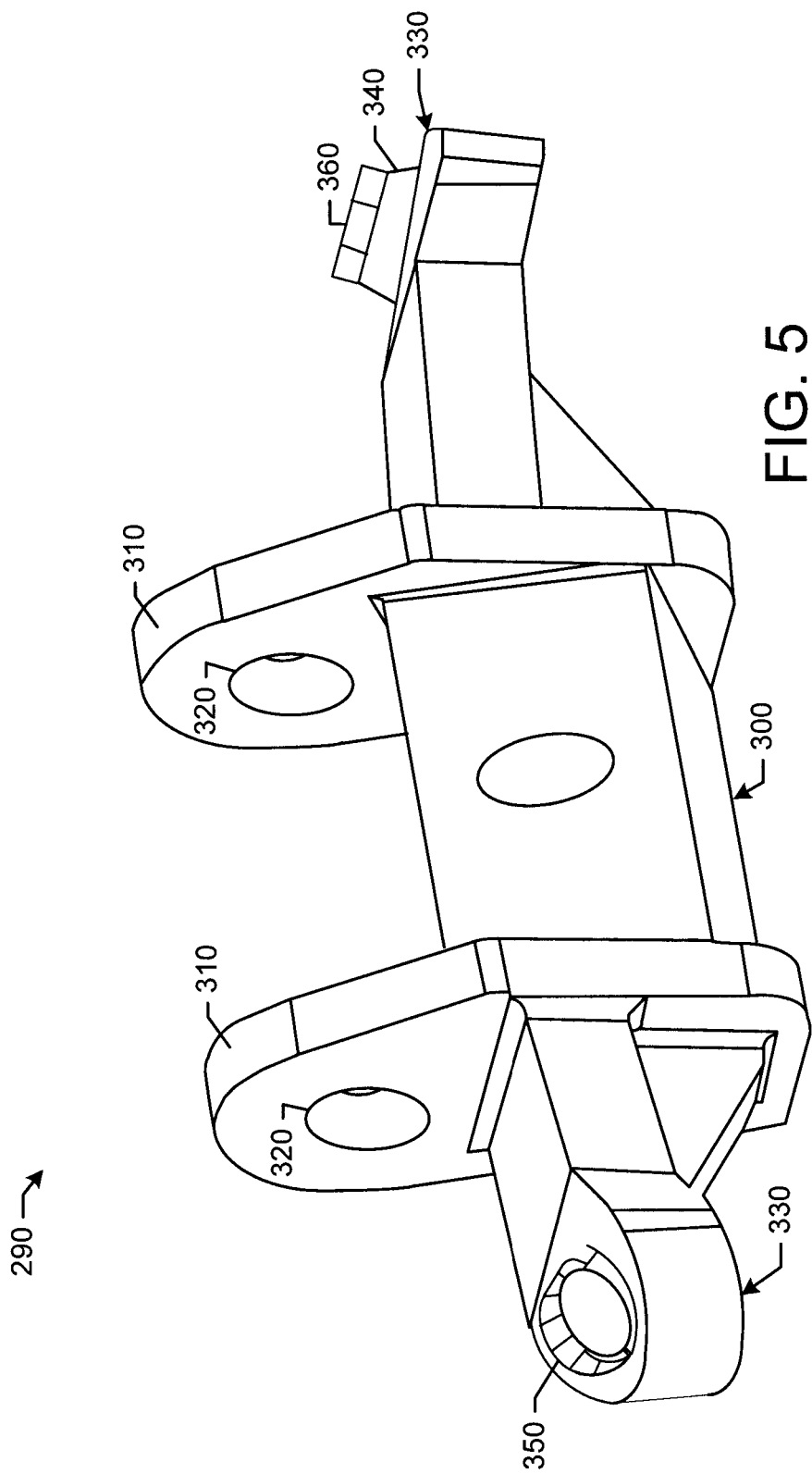
FIG. 5 is a front plan view of an inner diameter mounting bracket of the combustor aft mount assembly of FIG. 3.

As is shown in FIGS. 3-5, the combustor 100 may include an aft mounting assembly 200. The aft mounting assembly 200 may be positioned at the aft end of the combustor 100 about the transition piece 120. The aft mounting assembly 200 may be used to mount the combustor 100 to a compressor discharge casing 210 and the like. The combustor 100 also may be mounted elsewhere. The aft mounting assembly 200 may include an aft frame 220. The aft frame 220 may be attached to the liner 140 at the aft end thereof. The aft frame 220 may have any suitable size, shape, or configuration. The aft frame 220 may be welded to the liner 140, cast as a single element, or otherwise attached. The aft frame 220 may have one or more aft seals 230 thereon. The aft seal 230 may be of conventional design. The aft seals 230 may prevent the loss of the combustion gases 35 as the combustion gases 35 flow from the combustor 100 to the turbine 40.

The aft mounting assembly 200 may include an inner diameter mounting flange 240. The inner diameter mounting flange 240 may be attached to the aft frame 220 at a bottom end thereof. The inner diameter mounting flange 240 may be attached to the aft frame 220 via welding, casting, and the like. The inner diameter mounting flange 240 may have any suitable size, shape, or configuration. The inner diameter mounting flange 240 may extend towards a pivot rod assembly 250. The pivot rod assembly 250 may include a pivot rod 260 and a pivot rod flange 270. The inner diameter mounting flange 240 and the pivot rod assembly 250 may be connected via flange bolts and other types of fastening devices. The pivot rod assembly 250 may have any suitable size, shape, or configuration. Other components and other configurations also may be used herein.

The aft mounting assembly 200 may include an inner diameter mounting bracket 290. The inner diameter mounting bracket 290 may include a mounting bracket base 300. A number of base flanges 310 may extend from the mounting bracket base 300. Each of the base flanges 310 may have a base flange aperture 320 therein. The mounting bracket base 300 may have any suitable size, shape, or configuration. The inner diameter mounting flange 240 may be pivotally attached to the inner diameter mounting bracket 290 via the pivot rod 260 extending through the base flange apertures 320. Other components and other configurations may be used herein.

The inner diameter mounting bracket 290 may include a number of bolting wings 330. The bolting wings 330 may extend circumferentially from the mounting bracket base 300. The bolting wings 330 each may have a bolt flange 340 with bolt aperture 350 extending therethrough. The bolt flanges 340 of the bolting wings 330 may accommodate a mounting bolt 360 therethrough so as to secure the mounting bracket base 300 of the inner diameter mounting bracket 290 to the compressor discharge casing 210 or elsewhere. The bolting wings 330 may have any suitable size, shape, or configuration.

The bolting wings 330 thus extend in the largely circumferential direction perpendicular to the flow of the combustion gases 35 through the combustor 100. Such circumferential positioning allows the aft mounting assemblies 200 described herein to be mounted about the inner diameter of the compressor discharge casing 210 while providing ease of access thereto. Specifically, the bolting wings 330 extend circumferentially adjacent to the combustors 15. Other components and other configurations may be used herein.

Figure 6:
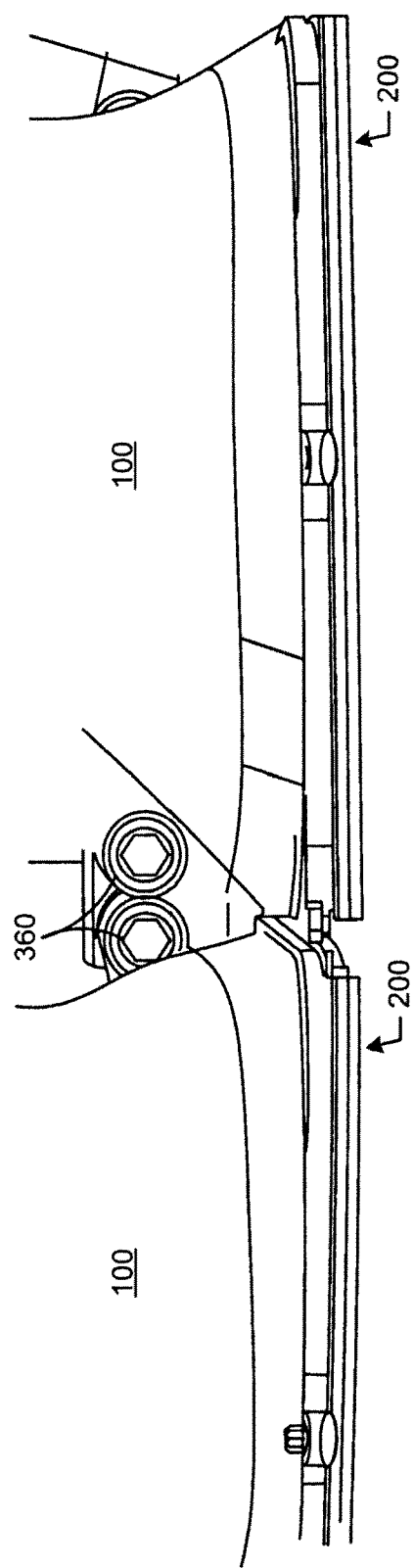
FIG. 6 is a perspective view of a pair of adjacent combustors each having a combustor aft mounting assembly.

As is shown in FIG. 6, the mounting bolts 360 of the aft mounting assembly 200 may align adjacent to the transition piece 120 of the combustor 100 for ease of access thereto. Specifically, the mounting bolts 360 may be accessed from either inside the compressor discharge casing 210 or from openings in the turbine shell. The aft mounting assembly 200 thus permits inner mounting so as to avoid thermal issues while allowing ease of assembly and access. Other components and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A gas turbine engine, comprising:
    a compressor discharge casing;
    a plurality of combustors configured in an annular array; and
    a plurality of aft mounting assemblies;
    wherein an aft mounting assembly of the plurality of aft mounting assemblies mounts a combustor of the plurality of combustors to an inner diameter of the compressor discharge casing;
    wherein the aft mounting assembly comprises an aft frame attached to the combustor, a mounting flange attached to an inner portion of the aft frame, and a mounting bracket attached to the compressor discharge casing and pivotally attached to the mounting flange;
    wherein the mounting bracket comprises a mounting bracket base with a pair of bolting wings extending circumferentially therefrom around the compressor discharge casing and perpendicular to a flow of combustion gases and the pair of bolting wings extend to opposite circumferential sides of the aft frame.

2. The gas turbine engine of claim 1, wherein the combustor comprises a liner and wherein the aft frame is connected to the liner.

3. The gas turbine engine of claim 2, wherein the aft frame is mounted on the mounting bracket.

4. The gas turbine engine of claim 1, wherein the pair of bolting wings comprise a bolt flange, a bolt aperture, and a mounting bolt extending in the bolt aperture.

5. The gas turbine engine of claim 1, wherein the mounting bracket comprises an inner diameter mounting bracket.

6. The gas turbine engine of claim 1, wherein the mounting bracket base comprises a plurality of base flanges.

7. The gas turbine engine of claim 6, wherein the plurality of base flanges comprises a base flange aperture.

8. The gas turbine engine of claim 1, wherein the mounting flange is pivotally attached to the mounting bracket via a pivot rod assembly.

9. The gas turbine engine of claim 8, wherein the pivot rod assembly comprises a pivot rod and a pivot rod flange.

10. The gas turbine engine of claim 9, wherein the mounting bracket base comprises at least one base flange extending therefrom, wherein the at least one base flange comprises a flange aperture.

11. The gas turbine engine of claim 10, wherein the pivot rod passes through the flange aperture and the pivot rod flange to pivotally attach the mounting flange to the mounting bracket.

12. A method of securing a mounting assembly of a combustor to a compressor discharge casing, comprising:
    positioning a mounting bracket on an inner diameter of the compressor discharge casing;
    attaching an aft frame to the combustor;
    wherein the mounting bracket comprises a mounting bracket base with a pair of bolting wings extending circumferentially therefrom around the compressor discharge casing and perpendicular to a flow of combustion gases and the pair of bolting wings extend to opposite circumferential sides of the aft frame;
    pivotally attaching the mounting bracket to the aft frame via a mounting flange attached to an inner portion of the aft frame;

accessing the bolting wings positioned circumferentially adjacent to the combustor from either inside the compressor discharge casing or from openings in a turbine shell; and securing a bolt through the bolting wing and the compressor discharge casing in a radial direction.

13. The method of claim 12, further comprising the step of accessing the bolting wing from radially outside the combustor.

\* \* \* \* \*